United States Patent
Badeer

(10) Patent No.: US 6,637,932 B2
(45) Date of Patent: Oct. 28, 2003

(54) ENGINE THRUST BEARING CONDITION MONITORING METHOD

(75) Inventor: Gilbert H. Badeer, Loveland, OH (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 10/214,294

(22) Filed: Aug. 7, 2002

(65) Prior Publication Data

US 2002/0186747 A1 Dec. 12, 2002

Related U.S. Application Data

(62) Division of application No. 09/399,196, filed on Sep. 17, 1999, now Pat. No. 6,439,767.

(51) Int. Cl.[7] .................................................. G01K 1/08
(52) U.S. Cl. ...................... 374/141; 374/134; 374/144; 73/119 R; 73/117.4
(58) Field of Search ................................ 374/141, 142, 374/144, 134, 102, 112, 169

(56) References Cited

U.S. PATENT DOCUMENTS

| | | | | |
|---|---|---|---|---|
| 4,318,179 A | * | 3/1982 | Kure-Jensen et al. | 73/462 |
| 4,502,043 A | * | 2/1985 | Moore | 374/144 |
| 4,620,185 A | * | 10/1986 | Plahmer | 73/119 R |
| 4,878,184 A | * | 10/1989 | Okada et al. | 374/169 |
| 4,914,672 A | * | 4/1990 | Hebrank | 374/124 |
| 4,955,728 A | * | 9/1990 | Hebrank | 374/124 |
| 4,982,347 A | * | 1/1991 | Rackerby et al. | 374/137 |
| 5,080,496 A | * | 1/1992 | Keim et al. | 374/144 |
| 5,176,034 A | * | 1/1993 | Hazony et al. | 73/597 |
| 5,319,963 A | * | 6/1994 | Benford | 374/141 |
| 5,803,608 A | * | 9/1998 | Randoll et al. | 374/144 |
| 5,892,145 A | * | 4/1999 | Moon et al. | 73/118.2 |
| 5,941,927 A | * | 8/1999 | Pfitz | 374/144 |
| 6,050,087 A | * | 4/2000 | Kurihara et al. | 374/144 |
| 6,095,946 A | * | 8/2000 | Maguire et al. | 477/98 |
| 6,141,087 A | * | 10/2000 | Viel | 356/35.5 |
| 6,360,616 B1 | * | 3/2002 | Halliday et al. | 73/862.49 |
| 6,522,990 B1 | * | 2/2003 | Rains et al. | 374/169 |

* cited by examiner

Primary Examiner—Diego Gutierrez
Assistant Examiner—Yaritza Guadalupe
(74) Attorney, Agent, or Firm—William Scott Andes; Barbara Joan Haushalter

(57) ABSTRACT

A method is provided for monitoring engine thrust bearing temperature deviations. Initially, key engine parameters are measured. A bearing temperature rise can be predicted based on the measured parameters. The predicted rise value is compared with the actual rise value to generate a comparison value. The system is trained to respond to the comparison value to prevent catastrophic failure.

6 Claims, 2 Drawing Sheets

ENGINE THRUST BEARING CONDITION MONITORING METHOD

This is a divisional of Application No. 09/399,196, filed Sep. 17, 1999, now U.S. Pat. No. 6,439,767.

BACKGROUND OF THE INVENTION

The present invention relates to gas turbine engines and particularly to engine thrust bearing condition associated with the gas turbine engines.

Industrial engines on occasion can exhibit catastrophic secondary engine damage upon incurring engine thrust bearing failure. Failures of thrust bearings can jeopardize the serviceability of engine high pressure turbine and compressor airfoils. This is particularly true when thrust bearing failure detection and subsequent engine shutdown measures are not immediately executed.

General industry practice has been to monitor bearing lubrication supply and scavenge temperatures. Another form of protection is a chip detection system located at bearing scavenge lines. These systems monitor the level of particles released by the bearing or associated sump hardware. These methods of protection primarily provide alarm and trip commands to the control system. An 'alarm only' mode permits an operator to acknowledge and correct the detected fault by reducing engine load level. However, during extended engine operating periods, subsequent to thrust bearing failure, catastrophic secondary damage can occur as scavenge temperature rises very rapidly.

It would be desirable, then, to be able to monitor engine thrust bearing temperature using a predicted sump temperature change to prevent catastrophic secondary engine damage.

BRIEF SUMMARY OF THE INVENTION

The present invention proposes to utilize various measured engine parameters to predict sump temperature rise, and then use the predicted sump temperature rise to monitor engine thrust bearing temperature. The predicted sump temperature rise is compared to the actual measured bearing temperature, and when the difference is greater than a predetermined value, the engine control system can automatically shut the engine down. This would prevent a catastrophic engine failure.

A method is provided for monitoring engine thrust bearing temperature deviations. Initially, key engine parameters are measured. A bearing temperature rise can be predicted based on the measured parameters. The predicted rise value is compared with the actual, measured, rise value to generate a comparison value. The system is trained to respond to the comparison value to prevent catastrophic failure.

Accordingly, the present invention provides an effective technique for monitoring engine thrust bearing temperature using a predicted sump temperature rise. The capability of predicting sump temperature rise and automatically tripping the engine can prevent a catastrophic engine failure. Furthermore, this reduces engine rebuild costs and downtime.

DETAILED DESCRIPTION OF THE INVENTION

The present invention compares a predicted sump temperature rise to an actual measured value from the engine. When the difference between predicted versus measured reaches a predetermined setpoint, an alarm and/or engine trip function is deployed. This technique can be built directly into the engine control software to prevent catastrophic engine failure.

Figure 1:
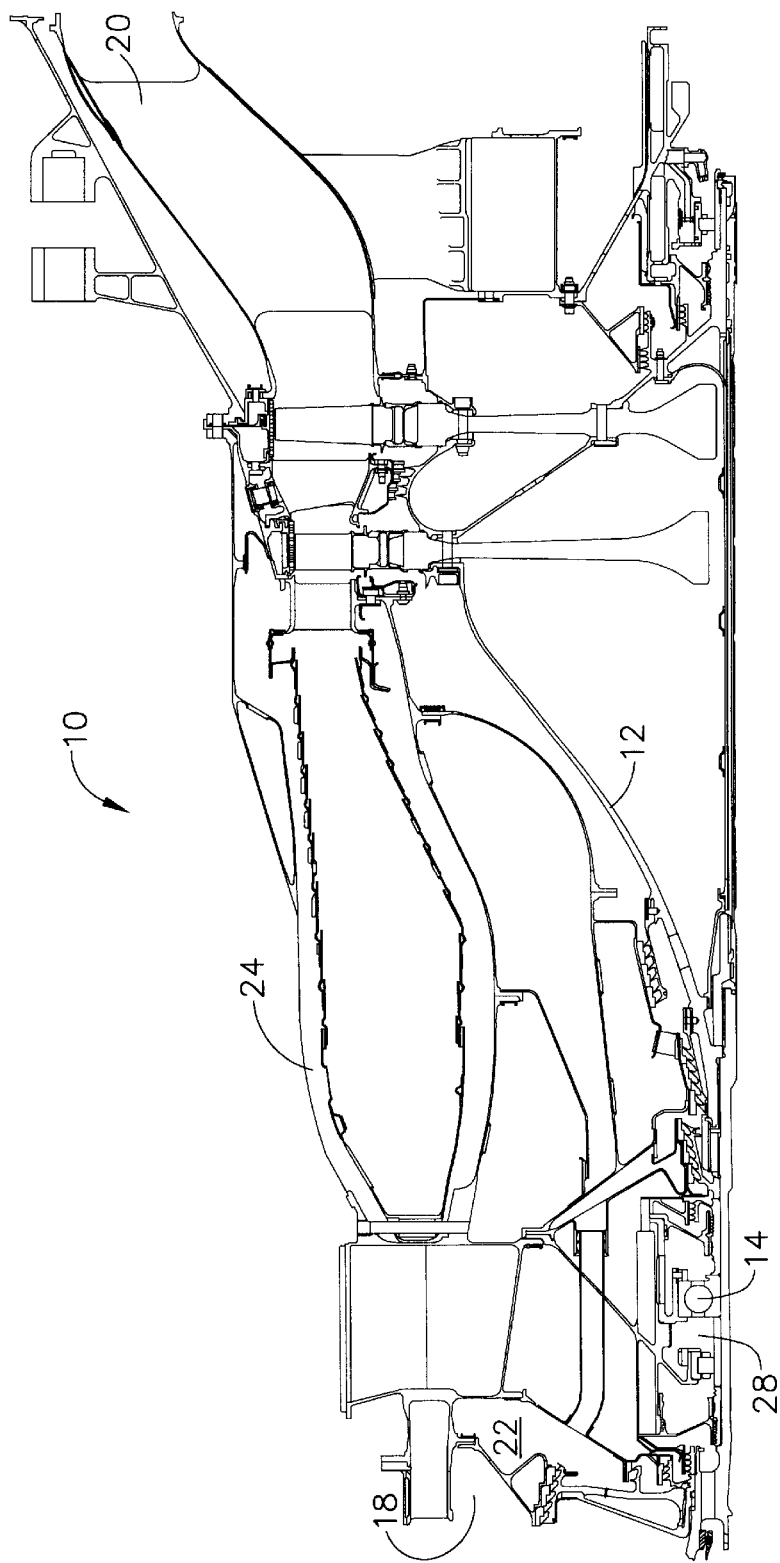
FIG. 1 is an engine illustrating the thrust bearing and other components relevant to predicting bearing temperature rise.

Referring now to the drawings, there is illustrated in FIG. 1 a partial cutaway view of a typical industrial engine 10. The engine thrust bearing condition monitoring system and method herein can be applied to such an engine 10. Several of the engine measured parameters are used to predict bearing temperature rise. This predicted bearing temperature rise is compared to the measured value. When the difference is greater than a predetermined value, automatic shutdown prevents catastrophic engine failure.

Continuing with FIG. 1, a high pressure turbine rotor (HPTR) 12 tends to load thrust bearing 14 in an axially aft direction. Meanwhile, the high pressure compressor rotor (HPCR) tends to counter that axial load by generating a high forward load. These two loads are not equal and are relatively high as compared to other engine cavity pressure contributors. These other engine cavities, such as P3 18, P48 20 and HP recoup 22, are all part of this axial loading of the thrust bearing. However, their individual axial load amplitudes are far smaller than HPTR and HPCR contributors. The HP recoup cavity pressure 22 is also an adjustable parameter. This adjustable feature is used to balance the net bearing loads to within an acceptable window of operability. The other element of the load equation is the engine 10 speed. Increasing speed levels tends to increase the thrust bearing ball radial loads. This generates more heat which is subsequently reflected by the increased sump scavenge temperature. Finally, the compressor rear frame (CRF) 24 is a structural membrane that houses multiple components.

Figure 2:
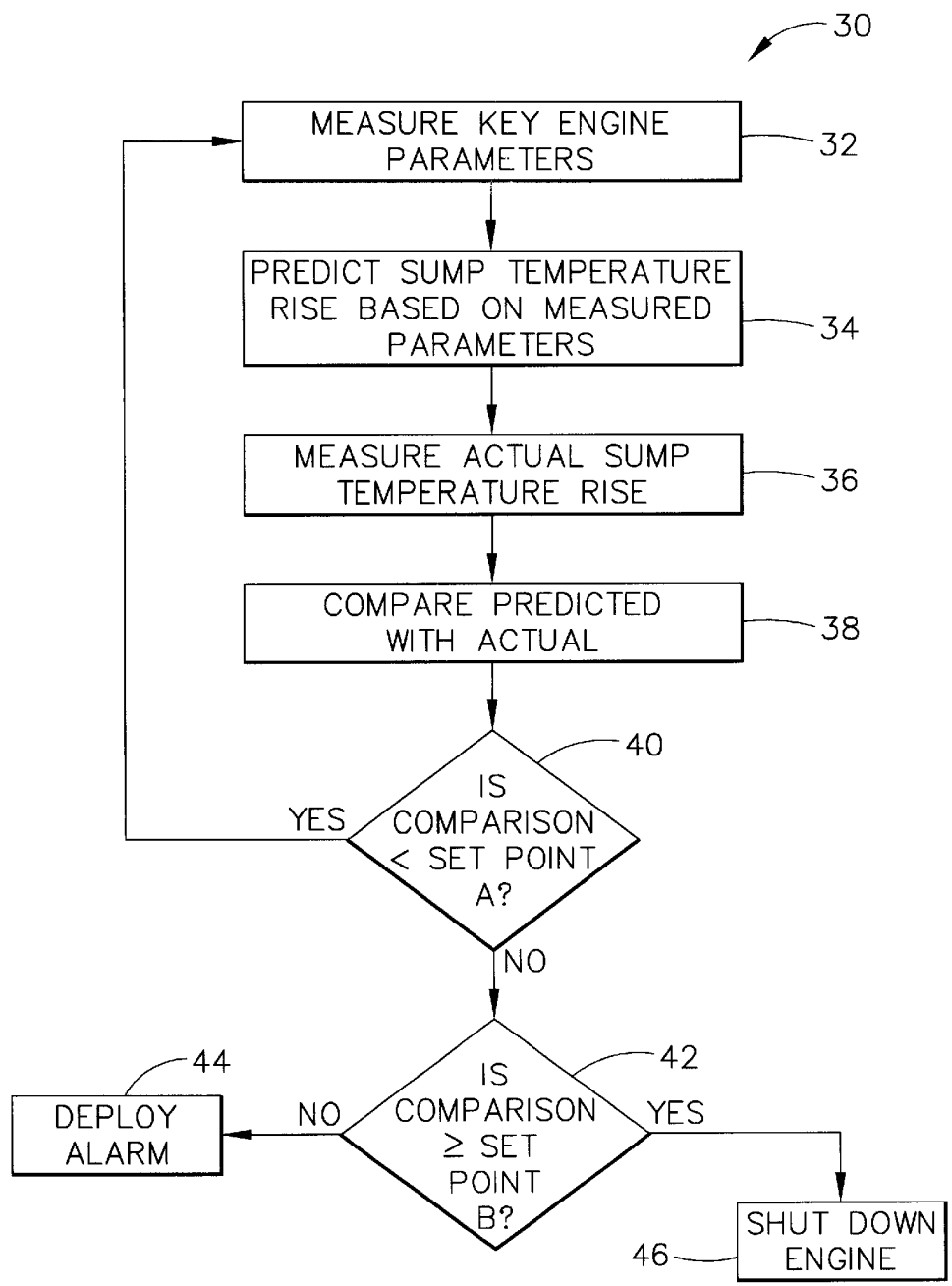
FIG. 2 is a flowchart block diagram illustrating the steps for predicting bearing temperature rise.

Referring now to FIG. 2, there is illustrated a flowchart diagram 30, illustrating the steps for predicting and monitoring engine thrust bearing conditions. Initially, at step 32, key engine parameters are measured. Key select contributors are high pressure recoup cavity pressure, engine speed, station P48 pressure, station P3 pressure, and some constant parameter. When these four select variables or parameters are used, the result is that a predicted temperature with a standard deviation of a mere 6.8 deg F. (3.8 deg C.) is achieved. Of these four variables, three constitute the major cavity pressures that are technically the major drivers. The last variable is engine speed, which can be expected to have a direct load contribution based on the physics of bearing design.

At block 34, the sump temperature rise is predicted, based on the measured parameters from block 32. The sump oil temperature rise includes all the contributors that affect scavenge oil temp. More than one bearing may be in any given sump (roller and ball types of bearings). Likewise, the environment surrounding the sump may also contribute to the sump scavenge oil temp rise. Conversely, bearing temperature rise is exclusively for that particular bearing in a given sump which experiences the measured temperature rise. Subsequently, at step 36, the actual sump oil temperature rise is measured. At block 38, the predicted value of block 34 is compared with the actual value of block 36. If the comparison is less than a set point A, steps 32 through 38 are repeated, to decision block 40. If the comparison is greater than or equal to a set point A, the program proceeds to decision block 42. If the comparison is less than a set point B, an alarm is deployed at block 44, indicating the sigma difference. If the comparison is equal to or greater than a set point B, the engine can be shut down at block 46 to prevent engine damage. This forces the operator/end user to physically inspect the engine for disclosure of failed components.

A regression analysis can be used to predict the sump temperature rise, as illustrated by the flowchart in FIG. 2. The scavenge temperature delta is determined using constants and measured engine parameters. The high pressure recoup cavity pressure is multiplied by a recoup pressure coefficient to provide a recoup contribution value. The P48 cavity pressure is multiplied by a cavity coefficient to provide a P48 cavity contribution value. The engine speed detected by rotational velocity of the core engine is multiplied by an engine speed coefficient. This gives an engine speed contribution value. The pressure at the PS3 cavity compressor-discharge pressure is multiplied by a coefficient. The summation of these four engine parameters, each multiplied by its associated coefficient, is used to calculate the predicted sump temperature rise. Finally, a fixed constant sump temperature rise can be added to the equation. The end result is a predicted sump temperature rise. A lube oil supply 28 temperature can be subtracted from the predicted sump temperature discharge/scavenge to give a delta value. The scavenge temperature delta is used to determine if engine operation is within a predetermined sigma level. The arbitrary sigma level, for example, can be 3 sigma, where 3 times 6.8 equals 20.4 deg F. delta, or 11.3 deg C. delta, between predicted versus measured value. If the arbitrary sigma level is surpassed, for example, to 4 sigma, or 27.2 deg F. (15.1 deg C.), a control trip can be launched. The deltas are taken into consideration at any given speed or power level.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for monitoring engine thrust bearing temperature, comprising the steps of:

measuring predetermined engine parameters;

predicting a bearing temperature rise based on the measured parameters;

measuring actual bearing temperature rise;

comparing the predicted rise value with the actual rise value to generate a comparison value; and responding to the comparison value to help prevent engine failure.

2. A method as claimed in claim 1 wherein the step of responding to the comparison value comprises the step of automatically triggering a signal when the comparison value exceeds a predetermined sigma level.

3. A method as claimed in claim 2 wherein the predetermined engine parameters comprise high pressure recoup cavity pressure, P48 cavity pressure, engine speed and compressor-discharge (P3 cavity) pressure.

4. A method as claimed in claim 3 wherein each predetermined engine parameter is multiplied by an associated coefficient.

5. A method as claimed in claim 4 wherein each associated coefficient is a fixed value used to calculate the predicted rise value.

6. A method as claimed in claim 1 wherein the step of responding to the comparison value comprises the step of automatically shutting off the engine when the sigma level is greater than a predetermined allowed sigma level.

\* \* \* \* \*